United States Patent [19]

Lenke et al.

[11] 4,151,333

[45] Apr. 24, 1979

[54] CELL REGULATORS IN STRUCTURAL FOAMS

[75] Inventors: Gerd M. Lenke, Swarthmore; Elwood E. Huntzinger, Springfield; Dewey G. Holland, Chadds Ford, all of Pa.

[73] Assignee: Air Products and Chemicals, Inc., Allentown, Pa.

[21] Appl. No.: 820,576

[22] Filed: Aug. 1, 1977

[51] Int. Cl.$^2$ ............................................... C08J 9/10
[52] U.S. Cl. ..................................... 521/95; 260/874; 260/895; 260/898; 260/901; 521/134; 521/139; 521/180; 521/908
[58] Field of Search ................. 260/874, 2.5 R, 2.5 N; 521/139, 134, 95

[56] References Cited

U.S. PATENT DOCUMENTS

| | | | |
|---|---|---|---|
| 3,725,321 | 4/1973 | Wirth et al. | 260/874 |
| 4,045,382 | 8/1977 | Braese et al. | 260/2.5 R |

*Primary Examiner*—Morton Foelak
*Attorney, Agent, or Firm*—Richard A. Dannells, Jr.; Barry Moyerman

[57] ABSTRACT

Cellular structure of blown structural polyphenylene oxide resins is regulated by incorporation of certain acrylamide polymers in the molding compositions thereof. The cell regulating acrylamide polymers may be homopolymers or co-polymers of acrylamide, or of substituted acrylamides or interpolymers of such acrylamide compounds with compounds containing a vinyl group.

19 Claims, No Drawings

CELL REGULATORS IN STRUCTURAL FOAMS

BACKGROUND OF THE INVENTION

1. Field of the Invention

The present invention relates to the preparation of structural foams and is particularly concerned with regulating or controlling the cellular structure of such foams made from foamable resin blends of polyphenylene oxide and polystyrene.

2. Prior Art

The preparation of various structural foamed articles has been described in prior patents and technical literature. Such foamed products are obtained by dispersing an inert gas through the polymer melt subjected to molding or by preblending the resin with a chemical blowing agent which releases inert gas on heating during the process. In the mold cavity the gas expands within the material constituting the polymer charge, thereby filling the mold and creating the internal cellular structure. As a result of the molding process, a surface skin is formed on the rigid foamed core.

Among the known processes for the production of structural foam resins, are those described in U.S. Pat. Nos. 3,268,638 and 3,436,446, and by Harris, W. D. in *Plastics Engineering*, May 1976, pp 26–30.

Methods for the preparation of polyphenylene ethers (also called polyphenylene oxides), are described in U.S. Pat. Nos. 3,306,874 and 3,306,875. The modification of polyphenylene ether resins by blending with polystyrene is described in U.S. Pat. No. 3,383,435 and elsewhere. High impact-resistant thermoplastic compositions comprising blends of polyphenylene ethers with polystyrene and with elastomer-modified polystyrene are described in published German patent applications No. 2,246,713 and 2,136,838.

Several blends of polyphenylene oxide/polystyrene are available commercially, principally under the trademark "Noryl" (General Electric Co.). Among these commercially available products are blends particularly suitable for the molding of structural foams. These are described in trade releases and in technical literature (J. L. Throne, Journal Cellular Plastics, September 1976, pp 264–283, particularly at pages 265, 272 and 273).

The blowing agent of the inert gas type most generally employed for structural foam resins is nitrogen. Among the chemical blowing agents for polyphenylene oxide/polystyrene blends, the recommended agents include: azobisformamides, p-toluene sulfonyl semicarbazides, trihydrazino-S-triazine, 5-phenyl tetrazole.

Among the problems encountered in certain structural foams, also occurring in blown polyphenylene ether/polystyrene blends, are the coarseness and irregularity of the cellular structure, which have an adverse effect on mechanical properties as well as on surface appearance. By utilization of the present invention products of improved cell structure are obtained from blowable polyphenylene/polystyrene resin blends.

STATEMENT OF THE INVENTION

It has now been unexpectedly found that the cell structure of blown polyphenylene oxide/polystyrene resin blends can be improved by incorporation into the molding compositions comprising such blends as a cell regulator comprising a small amount of an acrylamide linear polymer obtained by polymerizing an acrylamide compound with or without another compound containing a vinyl group. The acrylamide compound may be acrylamide as such, or a substituted acrylamide retaining the

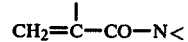

moiety, with substituents on either or both the amido nitrogen and the alpha carbon atom. The vinyl compound may be an acrylate or methacrylate compound, or an acrylonitrile; or the vinyl group of such vinyl compound may be a vinyl ester of a carboxylic acid or the side chain of a carbocyclic or heterocyclic compound as for example, in styrene and vinyl pyrrolidone. Typical examples of such acrylamide linear polymers useful in practice of the invention are set out below.

Stated generally the acrylamide polymers employed must contain a repeated moiety represented by the formula

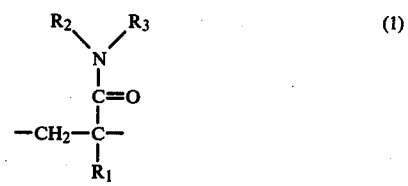

Acrylamides of the foregoing formula (I) may be made either by homopolymerization or copolymerization of monomers of the formula

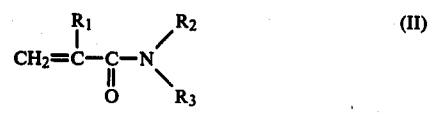

which monomers may be the same or different, or by interpolymerizing one or more monomers of the above formula (II) with a compound of the formula

In the foregoing formulae, $R_1$ stands for H or an alkyl group of 1 to 4 carbon atoms;

$R_2$ and $R_3$ are independently selected from the group of H, hydrocarbyl of 1 to 20 carbon atoms, which hydrocarbyl group may contain substituents (A) as hereinafter indicated, provided that if $R_2$ is other than H or alkyl of 1 to 10 carbons, $R_3$ must be H.

$R_4$ and $R_5$ are independently selected from the group consisting of H, hydrocarbyl of 1 to 20 carbon atoms and substituents of hereinafter recited groups (A), (B), (C) and (D), provided that if $R_4$ is H, hydrocarbyl or (A) then $R_5$ is taken from group (B), (C) or (D); said group (A) consisting of hydrocarbyl of 1 to 20 carbon atoms substituted by one or more substituents from the group consisting of halogen, cyano, hydroxy, mercapto, acyl of 1 to 20 carbon atoms, carboxyalkyl of 1 to 20 carbon atoms, oxyacyl of 1 to 20 carbon atoms, amino, mono- and dialkyl amino having 1 to 20 carbon atoms in the alkyl group;

said group (B) consisting of halogen, cyano, oxa-alkyl, thia-alkyl, acyl of 1 to 10 carbon atoms, —SO₃H, pyridyl, imidazolyl, pyrrolidyl, pyrrolidonyl and furanyl;

said group (C) consisting of carboxyalkyl residues of the formula

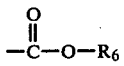

wherein R₆ is H, hydrocarbyl of 1 to 20 carbon atoms, oxa-alkenyl, thia-alkenyl, hydrocarbyl of 1 to 20 carbon atoms substituted by at least one substituent of the above-recited (A) group, furfuryl, tetrahydrofurfuryl, and polyalkylene glycols of the formulae

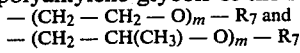

wherein m is 2 to 15 and R₇ is H or a hydrocarbyl radical of 1 to 10 carbon atoms;

and said group (D) consists of oxyacyl residues of the formula

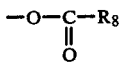

wherein R₈ is H, hydrocarbyl of 1 to 20 carbon atoms, or a substituted hydrocarbyl radical containing one or more substituents from the above-recited (A) group.

DESCRIPTION OF THE PREFERRED EMBODIMENTS

The acrylamide polymer employed as the cell regulating agent should consist of at least 50% and preferably at least 80% of the moiety of formula I as the repeating unit in the average molecule of the final polymer. End groups of the polymer are usually formed by the residues of the initiator or of the transfer agent employed in forming the polymer or such end groups may be hydrogen or a vinylidene group. The polymers useful in the present invention must be solid at ambient temperatures and preferably not melting or softening below 150° C. Molecular weights (number average as determined for examples by vapor phase osmometry) may vary from 1,000 to 100,000, those in the range of 1,000 to 20,000 being preferred. The preferred particle size of the polymers is that below 150 or 160 microns. The color of the polymer should be light, preferably white.

Polymers containing the moiety of formula I may be obtained:
a. by homopolymerizing identical monomers of formula II;
b. by interpolymerizing two or more monomers of formula II having one or more differences in the substituents R₁, R₂ and/or R₃;
c. by interpolymerization of identical or different monomers of formula II above with identical or different monomers corresponding to formula III.

The cell regulators of the invention are added to blowable polyphenylene oxide/styrene compositions in concentrations of 0.1 to 10 parts by weight per hundred parts resin; preferably at 0.5 to 5 parts/hundred, prior to commencement of foaming. Polymers of high acrylamide content (above 85% by weight) showed best results at levels of 0.5 to 5 parts per hundred of resin at blowing temperatures of 450° F. (232° C.) and some of these also at temperatures of 500° and 550° F. (=260° and 288° C.). The most effective polymers were those prepared in a special way, described hereinafter, which resulted in fine powders having molecular weights below about 10,000.

SYNTHESIS OF ACRYLAMIDE POLYMERS

The polymers useful as cell regulating agents in practice of the present invention are best prepared by free radical initiation of the monomers hereinabove described. Suitable initiators are all those capable of producing free radicals. Examples of such initiators are organic peroxides such as benzoyl peroxide, lauroyl peroxide, t-butyl peroxy pivalate (Lupersol 11, Pennwalt), decanoyl peroxide (Decanex F, Pennwalt), bis (4-t-butylcyclohexyl) peroxydicarbonate (Percadox 16, Noury Chemical Corp.); azo type initiators, such as 2-2'-azo bis (isobutyronitrile) (Vazo 64, du Pont), 2,2'-azobis (2,4-dimethylvalero nitrile) (Vazo 52, du Pont). The azo type initiators are especially preferred.

Also useful as initiators in preparation of the cell-regulating acrylamide polymers are such as ammonium or potassium persulfate, hydrogen peroxide or redox type initiators such as persulfates in combination with reducing agents, notably ferrous salts, bisulfites, formaldehyde sulfoxylate, tertiary amines; or chlorate/sulfite systems.

Preferably, the polymerization reaction is conducted in a suitable solvent or dispersing agent, for example in alcohols such as those containing 1 to 5 carbon atoms; acetone, acetonitrile; ethers, such as diethyl ether, tetrahydrofuran, dioxane, ethylene glycol mono butylether; dimethyl sulfoxide, dimethyl formamide, pyridine and water. Any combination of these solvents can be used, depending on the solubility or dispersibility requirement of the initial monomer or monomers. Less polar solvents or those with poorer solvency for the monomers may be used in combination with the preferred solvents hereinbefore named, such as aromatic or aliphatic hydrocarbons or halogenated hydrocarbons.

For the preparation directly of preferably desired fine, powdered polymers, it is advantageous to employ lower alcohols as solvents, such as methanol, ethanol, or isopropanol, or combinations of these. In these alcohols the monomers are usually soluble to a sufficient extent (i.e. more than 10% by weight). The corresponding polymers are often virtually insoluble in the reaction medium and precipitate as fine powders as they are formed. Polymerization conditions and monomer types which produce uniform, particulate polymer powders of less than about 150 micron size are most preferred.

The polymerization reactions may be conducted at temperatures ranging from room temperature up to the reflux temperature of the solvent system employed. Reduced or elevated pressures may be used, but generally are not required.

The polymerization reactions may be carried out in any of the following modes:
a. all ingredients are charged at the start of the reaction;
b. some of the ingredients are charged initially and the remaining components are added over the course of the polymerization in increments or in continuous fashion;
c. after the reaction has been started, all components are charged continuously while at the same time the formed polymer and other components are continuously removed from the reaction (continuous operation).

To regulate molecular weight of the polymers chain transfer agents may be added to the reaction at any stage thereof. These agents are advantageously used in low concentration, that is at less than 20%, preferably less than 10%, by weight based on the monomer content and dependent upon the efficacy of such agents and the final molecular weight modification desired. Typical classes of transfer agents are: mercaptans, partially or totally halogenated hydrocarbons and compounds containing active hydrogen. Specific examples of these include: n-dodecylmercaptan, t-butyl mercaptan, mono bromo trichloro methane, tetrabromo methane, chloroform, carbon tetrachloride, phenol, acetaldehyde, isopropanol. Transfer agents which are only mildly effective, such as isopropanol, may be employed in larger amounts, even as principal diluents or as the sole reaction medium.

Product Application

Polyphenylene oxide resins in grades employed for the production of structural foam resins are generally of relatively high melting point, substantially above 150° C. At 150° C., however, these resins can be milled or worked. In customary practice, the resin is blended with a chemical blowing agent, then molded or extruded into shaped articles while heated in the mold to the blowing temperature, generally in the range of 175° to 290° C., causing it to expand into a foam within the mold. When inert gas is employed as the blowing agent, the resin is charged to the extruder and the gas is added directly to the molten resin composition in the extruder barrel. In either case, the cold foam has structural, load-bearing properties. In the absence of the cell control agents employed in accordance with the present invention, the foam structure is very coarse and irregular, having an undesired effect on its mechanical properties as well as on surface appearance. To obtain the improved structural foams, the control agents of the invention may be added in concentrations of 0.1 to 10 parts by weight per hundred parts of the polyphenylene oxide resin composition, preferably 0.5 to 5 parts by weight of such resin in the composition.

The most generally known polyphenylene oxide resins employed in the production of structural foams are those composed of amorphous blends of a polyphenylene oxide and polystyrene, one commercial form of which is designated "Noryl" FN-215 (General Electric Co.). This commercial resin consists essentially of an amorphous blend of poly-(2,6-dimethyl-1,4-phenylene) oxide and polystyrene having 46 dimethyl phenyl oxide units for 54 styrene units (corresponding to about equal parts by weight) and containing about 6% of mineral filler. The blend has a glass transition temperature of about 140° C. The polyphenylene oxide in the blend has a weight average molecular weight of about 37,000 (determined by light scattering) and the polystyrene has an average molecular weight of about 430,000.

A typical formulation employing a chemical blowing agent may comprise 96 parts of the polyphenylene oxide polystyrene resin blend and 4 parts of blowing agent concentrate, which may comprise a blowing agent, such as p-toluene sulfonyl semi-carbazide, incorporated in resin of the same type as that to be blown. To 100 parts of the mixture of resin and blowing agent 0.5 to 5 parts of the acrylamide polymer is added as cell regulator.

The recommended cell control agents are sufficiently dispersible, but not necessarily soluble in the polyphenylene oxide resin composition at the blending temperature. Desirably, the finished foam should not exhibit any visually detectable particles of the acrylamide polymer employed.

The degree of effectiveness of the particular acrylamide polymer selected for use as cell regulator appears to vary according to its chemical composition, molecular size and particle size. Found to be most effective are the acrylamide homopolymers and copolymers containing up to 10% by weight of either N-substituted acrylamide or acrylates or methacrylates with long chain alcohol components. In any case, the number average molecular weight of the acrylamide polymer employed should preferably be below 10,000 and the average particle size thereof below about 150 microns.

EXAMPLE 1

Preparation of an acrylamide/styrene copolymer
(charge ratio 75 AMD/25 St)

A 2-liter, 3-necked round bottom flask was equipped with stirrer, thermometer, reflux condenser, gas in- and outlet. The apparatus was purged with $N_2$ for 30 minutes and then charged with 253 ml of methanol and 150 grams AMD (acrylamide).

The mixture was stirred until all AMD had dissolved. Then 50 grams of styrene and 1.0 grams of VAZO 64 [azobis(isobutyronitrile)] were added and the reaction mixture was heated to 60° C., when the clear solution started to become turbid. An exothermic reaction occurred, which was contained by the cooling effect of the solvent. A fine white precipitate formed which was kept dispersed by sufficient agitation. After a total reaction time of approximately four hours, at or near reflux temperature of the system (60° to 74° C.), the mixture was allowed to cool to room temperature.

The resulting thick, white paste was dried under vacuum at about 100° C. for several days. The yield of white solid was 173 grams. The nitrogen content was 15.5%, suggesting 78% AMD in the final polymer.

EXAMPLE 2

Example 1 was repeated but reaction time was shortened to 2.5 hours. One hundred and eighty grams of a white solid were obtained, which was easily ground into a fine powder. It contained 15.5% N (78% AMD). The product improved the cell structure of "Noryl" foam blown at 450° and 475° F., when added at a concentration of 2 to 5 parts per hundred "Noryl", notably, compared to an unstabilized control sample.

EXAMPLE 3

Copolymer of AMD/St = 90/10 by weight

A 2-liter resin kettle was used for this experiment. After purging with $N_2$, the following ingredients were charged:
300 Grams Methanol
180 Grams AMD
20 Grams Styrene
1.0 Grams VAZO-64

The polymerization visually started at about 55° C. and was quite exothermic; maximum temperature was 66° C. After two hours, a white paste was obtained, which was dried under vacuum, yielding 200 grams. The polymer was easily ground into a fine, white powder, containing 16.9% N, which went through a 50 micron screen. The product was very effective as a cell regulator in concentrations of 0.5 to 5 pph "Noryl" at 450° and 475° F. blowing temperatures (~232° and 246° C.).

under Examples 4 to 16, were employed. "Percent" is based on monomer charge or total polymer obtained, respectively.

| Example No. | Comonomer Type | Charge % | Solvent Type | Initiator % | | Mode of Reaction | Polymer Yield % | N % |
|---|---|---|---|---|---|---|---|---|
| 17 | IBMA | 10 | W[(1)] | 0.25 | $K_2S_2O_8$ | Batch | 99[(3)] | 15.9 |
| 18 | IBMA | 10 | M[(2)] | 0.5 | VAZO 52 | Batch | 99 | 17.3 |
| 19 | IBMA | 10 | M | 0.5 | VAZO 64 | Batch | 99 | 17.4 |
| 20 | IBMA | 25 | M | 0.5 | VAZO 52 | Batch | 99 | 14.5 |
| 21 | IBMA | 25 | M | 0.5 | VAZO 64 | Batch | 99 | 19.8 |
| 22 | n-BMA | 10 | M | 0.5 | VAZO 52 | Batch | 99 | 17.2 |
| 23 | LA | 10 | M | 0.5 | VAZO 52 | Batch | n.d.[(4)] | 17.0 |
| 24 | LA | 10 | W | 0.25 | $K_2S_2O_8$ | Batch | 99 | 16.7 |
| 25 | LA | 20 | M | 0.5 | VAZO 52 | Batch | 99 | 15.2 |
| 26 | STA | 10 | M | 0.5 | VAZO 52 | Batch | 99 | 17.4 |
| 27 | STA | 10 | W | 0.25 | $K_2S_2O_8$ | Batch | 99 | 16.4 |
| 28 | STA | 20 | M | 0.5 | VAZO 52 | Batch | 99 | 15.3 |
| 29 | 2-EHA | 10 | M | 0.5 | VAZO 52 | C.M.A.[(5)] | 99 | n.d. |
| 30 | 2-EHA | 10 | W | 0.3 | $K_2S_2O_8$ | C.M.A. | 99 | 16.3 |
| 31 | TDMA | 10 | M | 0.5 | VAZO 52 | C.M.A. | 97 | 17.4 |
| 32 | CBA | 5 | W | 0.5 | $K_2S_2O_8$ | C.M.A. | 99 | 18.7 |
| 33 | THFA | 10 | M | 1.0 | VAZO 52 | C.M.A. | 98 | 17.6 |
| 34[(6)] | STMA | 10 | M | 1.0 | VAZO 52 | C.M.A. | 99 | 17.9 |
| 35 | TBAEMA | 10 | M | 1.0 | VAZO 52 | C.M.A. | 93 | 18.5 |

EXAMPLES 4 TO 16

Copolymers of AMD/St in Charge Ratios Between 95/5 to 10/90 by weight

In the following 13 experiments the charge ratio of AMD/St was changed as shown. Reaction medium was methanol, catalysts were of azo-type, and reaction temperatures were around reflux of the systems: 60° to 70° C.

Abbreviations:
IBMA = isobutyl methacrylate
n-BMA = n-butyl methacrylate
LA = lauryl acrylate
STA = stearyl acrylate
2-EHA = 2-ethylhexyl acrylate
TDMA = tridecyl methacrylate
CBA = Carbowax 550 acrylate (Union Carbide)

| Example Number | AMD/St (Wt. Ratio) | Catalyst (% on Monomers) | Mode of Reaction | Yield (% of Monomer Charge) | % N |
|---|---|---|---|---|---|
| 4 | 95/5 | 1 | VAZO 52 | C.M.[(1)] | 93 | 18.3 |
| 5 | 85/15 | 1 | VAZO 52 C.M. | 100 | 16.3 |
| 6* | 80/20 | 0.25 | VAZO 64 | Bottle[(2)] | 100 | 15.6 |
| 7* | 80/20 | 0.5 | VAZO 64 | Bottle | 100 | 15.6 |
| 8* | 60/40 | 0.4 | VAZO 64 | Bottle | 80 | 12.4 |
| 9* | 60/40 | 0.6 | VAZO 64 | Bottle | 80 | 12.0 |
| 10 | 50/50 | 0.5 | VAZO 52 | Batch[(3)] | 80 | — |
| 11* | 40/60 | 0.4 | VAZO 64 | Bottle | 80 | 8.5 |
| 12 | 40/60 | 0.6 | VAZO 64 | Bottle | 90 | 8.3 |
| 13* | 20/80 | 0.5 | VAZO 64 | Bottle | 70 | 3.8 |
| 14* | 20/80 | 0.75 | VAZO 64 | Bottle | 75 | 3.5 |
| 15* | 10/90 | 0.75 | VAZO 64 | Bottle | 75 | 1.2 |
| 16* | 10/90 | 1.0 | VAZO 64 | Bottle | 79 | 1.3 |

*two batches run each
[(1)]Twenty percent of solvent and 10% of monomer plus catalyst were charged at start, remainder of solvent, monomers and catalyst were pumped into reaction at reflux over a period of four hours in two separate streams: a. monomers plus solvent b. catalyst plus solvent
[(2)]Bottle polymerization: all charged at start.
[(3)]Batch polymerization: as described in Examples 1-3.

Products from Examples 4 and 5 were most effective as foam stabilizers in "Noryl". Products were decreasingly poorer in their stabilizing and cell controlling effectiveness with decreasing AMD content.

EXAMPLES 17 TO 35

Various Copolymers of AMD with Acrylates or Methacrylates

In the following experiments, copolymerizations of AMD with monomers shown were conducted. Methanol or water were used as reaction media. In case of methanol, reactions were run at reflux temperatures, in case of water, at 50° to 70° C. Either batch processes or continuous monomer/catalyst addition, as described

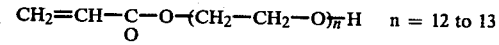
$CH_2=CH-C-O-(CH_2-CH_2-O)_{\overline{n}}H$   n = 12 to 13
       $\|$
       $O$ THFA = tetrahydrofurfuryl acrylate (ARC Chemical)
STMA = stearyl methacrylate
TBAEMA = t-butylaminoethyl methacrylate
1. Water; typical monomer concentration: 15 to 16%; about 2% isopropanol present as chain transfer agent.
2. Methanol; typical monomer concentration: 25 to 50% in batch reactions and approximately 20% in continuous monomer reactions (C.M.A. types).

3. Water polymerized products are extremely difficult to dry; therefore, apparent yields exceed 100% of the monomer charge, while AMD contents are consequently lower than the charge suggests.
4. Not determined.
5. Approximately 20% of the solvent, 10% of the monomers, and 10% of the catalyst are charged and brought to reaction at or near reflux temperature. At that point, two solutions are pumped into the reaction separately, but simultaneously, usually over a period of three to four hours. Solutions contain: (a) all of the remaining monomers plus a portion of the remaining solvent sufficient to dissolve the monomers, and (b) all of the remaining catalyst plus all of the remaining solvent.
6. This run was also scaled-up by a factor 10.

Example of Testing in Noryl Foams

An expandable Noryl formulation was prepared by milling 96 grams of Noryl FN-215 resin and 4 grams of blowing agent concentrate on a 2-roll rubber mill at roll temperatures of 140° C. for 10 minutes.

Similar formulations were prepared in the same manner; but in addition, a cell control additive, an acrylamide-stearyl methacrylate copolymer was added in amounts of 0.5 grams, 1.0 grams, 2 grams, 3 grams and 5 grams.

Samples cut from milled stocks were expanded in a preheated mold in a compression press at temperatures of 232° C. and 260° C. The mold cavity was only partially filled with milled stock to allow for expansion after heating to decompose the blowing agent. One half of each mold cavity was filled with a control compound (compound without cell control additive) and the other half with the test compound. After charging this preheated mold with milled stocks the mold with coverplate was placed in a heated press and held for three minutes at about 2000 psi. After releasing the pressure and cooling the mold, the foamed sample was removed and broken to examine the cell structure.

The control foam showed very coarse and irregular cell structure at both temperatures used. Those foams containing the acrylamide-stearyl methacrylate copolymer additive all displayed fine uniform cell structure at both temperatures.

EXAMPLES 36 TO 43

Copolymers of AMD with Vinylstearate (VST)

A series of copolymerizations was conducted with the monomer pair AMD/VST in charge ratios listed below. Reaction medium was isopropanol; final monomer concentration was 22%; as catalysts were employed VAZO 52 or 64, as indicated. All polymerizations were conducted in the fashion of the C.M.A. method applied and described in Examples 29 to 35.

| Ex. No. | AMD/VST | VAZO (%) | Yield (%) | N (%) | AMD (%) |
|---|---|---|---|---|---|
| 36 | 95/5 | 1.0 V-52 | 95 | 18.4 | 93 |
| 37 | 95/5 | 1.0 V-64 | 96 | 18.7 | 95 |
| 38 | 90/10 | 1.0 V-52 | 91 | 18.3 | 93 |
| 39 | 90/10 | 1.0 V-64 | 90 | 18.1 | 92 |
| 40 | 85/15 | 1.0 V-52 | 89 | 17.8 | 90 |
| 41 | 85/15 | 1.0 V-64 | 87 | 17.9 | 91 |
| 42 | 80/20 | 1.0 V-52 | 83 | 17.4 | 88 |
| 43 | 80/20 | 1.0 V-64 | 83 | 17.7 | 90 |

EXAMPLES 44 TO 55

Copolymerizations of AMD with Various Amide and Nitrile Type Monomers

The polymerizations were conducted in alcohols or in water with catalysts as indicated below. Either batch or C.M.A. processes were employed. Polymerizations were run at reflux in case of alcohol systems and at 50° to 70° C. in case of aqueous systems.

| Example Number | Comonomer Type (%) | | Solvent Type | Initiator (%) | Mode of Reaction | Yield (%) | N (%) |
|---|---|---|---|---|---|---|---|
| 44 | IMBA* | 10 | $W^{(1)}$ + | 0.3 $K_2S_2O_8^{(2)}$ 0.3 $Na_2S_2O_5$ | $C.M.A.^{(1)}$ | 99 | 18.6 |
| 45 | NTBA | 10 | $M^{(3)}$ | 1.0 VAZO 52 | C.M.A. | 99 | 18.0 |
| 46 | NTBA | 20 | M | 1.0 VAZO 52 | C.M.A. | 99 | 16.7 |
| 47 | DAA | 10 | M | 1.0 VAZO 52 | C.M.A. | 95 | 18.6 |
| 48 | NVP | 10 | M | 1.0 VAZO 52 | C.M.A. | 99 | 19.0 |
| 49 | AN | 10 | $M^{(3)}$ | 1.0 VAZO 52 | C.M.A. | 98 | 20.3 |
| 50 | MAMD | 50 | $M^{(3)}$ | 1.0 VAZO $52^{(5)}$ | C.M.A. | 96 | 17.3 |
| 51 | MAMD | 25 | $M^{(3)}$ | 1.0 VAZO 52 | C.M.A. | 99 | 18.4 |
| 52 | MAMD | 75 | $P^{(4)}$ | 1.0 VAZO 52 | C.M.A. | 95 | 16.8 |
| 53 | MAMD | 90 | $P^{(4)}$ | 1.0 VAZO 52 | C.M.A. | 81 | 16.3 |
| 54 | NBMA | 10 | M | 1.0 VAZO 52 | C.M.A. | 96 | 18.7 |
| 55 | NBMA | 20 | $P^{(4)}$ | 1.0 VAZO 52 | C.M.A. | 94 | 17.3 |

*For abbreviations, see below

1. Water; monomer concentration 15.6%; 10% of total monomers plus catalyst plus 50% of water charged at start; remainder of AMD dissolved in water: (a) remainder of catalyst dissolved in water, (b) IBMA dissolved in isopropanol, and (c) added simultaneously, but separately over a period of four hours at 30° to 50° C.
2. Redox initiator system.
3. Also done in isopropanol with quite similar results.
4. Also done in methanol with quite similar results.
5. Also done with VAZO 64 with similar results.

Abbreviations:
IBMA = isobutoxymethylacrylamide
NTBA = N-tertiary-butylacrylamide
DAA = diacetone acrylamide
NVP = N-vinylpyrrolidone
AN = acrylonitrile
MAMD = methacrylamide
NBMA = N-benzylmethacrylamide Most polymers were obtained as fine, white powders (or could be ground easily to fine powders) which were effective foam stabilizers for the "Noryl" FN215 resin tested. Most effective were the copolymers with NTBA and NBMA.

EXAMPLE 56

Homopolymerization of Acrylamide

| Isopropyl alcohol | 1,000 ml. |
| --- | --- |
| Acrylamide | 300 gms. |
| Vazo 52 | 6.0 gms. |

100 ml. of isopropyl alcohol were heated to reflux (~84° C.) while stirring under nitrogen, as the precharge. While holding the precharge at reflux temperature, the monomer and catalyst solutions were added over a 30 minute period. The catalyst solution comprised 6 grams of the catalyst in 150 ml. isopropyl alcohol and the monomer solution consisted of 300 grams AMD in 750 ml. isopropyl alcohol.

Under completion of the charge, the reaction mixture was cooled down and stirring continued overnight under nitrogen. The product was filtered and the solids washed with isopropyl alcohol, refiltered and dried in a vacuum oven at about 70° C. There was obtained as product 305 grams of a fine white powder containing some small hard lumps. This constitutes a yield of 102% on AMD charged, indicating that the product was not completely dry. The product analyzed 18.9%N (19.7% is theoretical) corresponding to an actual yield of 98% on AMD charged. It had an intrinsic viscosity of 0.145 and melted at 199°–206° C. It should be noted that the determination of the exact melting point is difficult due to partial decomposition (amide groups condense to imide groups).

EXAMPLES 57–65

Homopolymerizations of AMD in Presence of Chain Transfer Agents

A series of AMD polymerizations was conducted in the presence of either monobromotrichloroethane (BrCCl$_3$) or n-dodecylmercaptan-(1) (C$_{12}$H$_{25}$SH) in increasing amounts per monomer charge as shown below.

All reactions were run in the same fashion; to a precharge of:
  200 ml methanol
  20 grams AMD 0.2 grams VAZO 52
  x grams transfer agent (10% of total in table below)
  stirred and heated (about 60° C.) under N$_2$ blanket were continuously added (via lab pumps) over the course of three hours at reflux temperature - two separate solutions:

1. 200 ml methanol 180 grams AMD 9 x grams transfer agent
2. 400 ml methanol 1.8 grams VAZO 52

In all cases reaction set in almost instantly, when about 60° C. was reached in the precharge.

Results are tabulated below.

Yields were very high in all cases, decreased however slightly (from 100% to 95%) with increasing BrCCl$_3$. All products were fine, white powders after drying.

| Example Number | BrCCl$_3$ (Parts per 100 Monomer) | C$_{12}$H$_{25}$SH (Parts per 100 Monomer) | Product Analysis % N | Product Analysis Meq. Halogen /Gram | % S | %CTA[1] Built-in | Intrinsic[2] Viscosity |
| --- | --- | --- | --- | --- | --- | --- | --- |
| 57 | 5 | 0 | 19.0 | 0.85 | — | 4.2 | 0.14 |
| 58 | 10 | 0 | 18.5 | 1.07 | — | 5.3 | 0.15 |
| 59 | 15 | 0 | 18.2 | 1.43 | — | 7.1 | 0.13 |
| 60 | 20 | 0 | 17.8 | 1.66 | — | 8.2 | 0.08 |
| 61 | 0 | 1.0 | 19.5 | — | 0.17 | 0.99 | 0.24 |
| 62 | 0 | 2.5 | 19.4 | — | 0.28 | 1.8 | 0.17 |
| 63 | 0 | 5.0 | 19.1 | — | 0.49 | 3.1 | 0.15 |
| 64 | 0 | 7.5 | 18.8 | — | 0.64 | 4.0 | 0.14 |
| 65 | 0 | 10 | 18.7 | — | 0.84 | 5.3 | 0.12 |

1. Chain transfer agent.
2. Determined at 30° C. of a diluted solution in one molar aqueous NaNO$_3$.

Results show the effectiveness of the CTA's in reducing the intrinsic viscosity (and therefore MW). Product analysis indicates that some or all of the CTA's are chemically incorporated into the polymer structures.

EXAMPLE 66

Homopolymerization of AMD in Presence or Absence of Chain Transfer Agent (CTA = C$_{12}$H$_{25}$SH)

An eight variable factorial design experiment (Box-Hunter) was conducted to explore the importance of process variables on final products, such as yield, polymer properties and performance as foam stabilizers in polyphenylene oxide/styrene resins.

The variables were:
(1) Reaction Medium
  (a) Methanol
  (b) Isopropanol
(2) Catalyst Type
  (a) VAZO 52
  (b) VAZO 64
(3) Catalyst Concentration
  (a) 0.2%
  (b) 2% (on monomer)
(4) Monomer Concentration
  (a) 100 grams/liter diluent
  (b) 300 grams/liter diluent
(5) Transfer Agent
  (a) None
  (b) 10 parts dodecylmercaptan/100 parts monomer (DDM)
(6) Temperature Range
  (a) 55 to 60° C.
  (b) maximum reflux temperature of systems
(7) Charge Procedure
  (a) 20% of diluent at start; all components metered in over the course of polymerization.
  (b) charged at start: 20% of each component-diluent, monomers, catalyst; remainder of each component is metered in as under (a).
(8) Reaction Time
  (a) 30 minutes addition time; no post reaction.
  (b) three hours addition time; one hour post reaction.

With respect to polymer yield variation (6) showed the strongest effect: highest average yields at higher temperatures (up to quantitative monomer conversion).

Intrinsic viscosity values obtained were in the range of 0.1 to 0.75 (corresponding to number average molecular weights of 1,900 to 40,000. Number average molecular weight is calculated from literature data according to the formula:

$$M_m = \frac{[\eta] \cdot 10^4}{6.8} \cdot \frac{1}{0.66};$$

wherein $[\eta]$ is the intrinsic viscosity.

Strongest effect was exhibited by variation (2): catalyst type.

All products showed some activity as cell stabilizers in polyphenylene oxide/styrene foam. The most effective and efficient polymer was obtained with the following parameters:

Variation: (1) b (Isopropanol)
(2) a (VAZO 52)
(3) b (2% VAZO)
(4) b (300 grams AMD/liter)
(5) a (no transfer agent)
(6) b (reflux temperature)
(7) a (all metered in)
(8) a (30 minutes reaction time)

EXAMPLE 67

A series of runs were carried out employing AMD homopolymers differing in intrinsic viscosity (molecular weight) to determine the effect of this variable on performance as a cell regulating agent in polyprophenylene oxide/styrene foamable resin. The results are tabulated in Table 1 below.

In Table 1, to compare overall properties of the AMD polymer, numerical ratings were assigned as follows:

| Visible Particles | Blown Resin Cellular Structure |
|---|---|
| none = 3 | F (fine) = 6 |
| very few = 2 | FM (fine to medium) = 5 |
| few = 1 | M (medium) = 4 |
| many = 0 | MC (medium to coarse) = 2 |
| | C (coarse) = 0 |
| | P. Col. = −2 (partial collapse) |

TABLE 1

| AMD Intrinsic Viscosity $[\eta]$ | Particles Visible | Blown at 450° F. parts/100 Noryl | | | | Blown at 500° F. parts/100 Noryl | | | Rating for 450→500° F. |
|---|---|---|---|---|---|---|---|---|---|
| | | 0.5 | 1 | 2 | 3 | 0.5 | 2 | 3 | |
| 0.10 | very few | MC | MC | M | M | MC/C | MC/C | C | C | 15 |
| 0.115 | none | M/MC | MC | MC | M | MC | C | C | C | 16 |
| 0.14 | none | MC | MC | MC | M/MC | C | C | C | C | 12 |
| 0.145 | none | F/M | F/M | F-F/M | F/M | M | M | F/M | M/C | 38.5 |
| 0.145 | few | MC | M/MC | M | FM | C | M/MC | C | C | 18.5 |
| 0.155 | none→very few | M/MC | M | M/MC | M | C | M/MC | M/MC | MC | 24.5 |
| 0.195 | few→many | M/MC | M/MC | M | FM | MC | MC | M | P. Col. | 21.5 |
| 0.285 | few | MC/C | MC | M/MC | M | MC/C | MC/C | M/MC | MC | 18 |
| 0.34 | few→many | C | M/C | M/C | C | C | M/C | M/C | C | 8.5 |
| 0.58 | few→many | M/MC | M/MC | M/MC | M | M/MC | C | M/MC | MC | 21.5 |
| 0.65 | few | MC | M | M/MC | M/MC | MC | MC | C | C | 17 |
| 0.695 | few | MC | MC | M/MC | M/MC | C | C | MC/C | C | 18 |
| 0.75 | none | C | C | M/C | M/MC | C | C | C | C | 8 |

The higher numerical ratings in the right end column of Table 1 indicate the best overall performance over the 450°–500° F. temperature range for the particular polyphenylene oxide/styrene resin composition tested.

EXAMPLE 68

Another series of runs were carried out on the same polyphenylene oxide/styrene resin with various acylamide polymers and copolymers, the results of which are set out in Table 2.

TABLE 2

| Regulator Composition | $[\eta]$ | MP °C. | Particle size (wt %) | | | | | Surface Area $M^2/g$ | Particles Visible | cell size Performance on Noryl | |
|---|---|---|---|---|---|---|---|---|---|---|---|
| | | | >149 μ | 90–149μ | 60–90μ | 30–60μ | <30 μ | | | at 450° F | at 500° F. |
| AMD/NTBA | 0.49 | 245–250 | 30 | 23 | 13 | 17 | 16 | 14 | few→many | M→MC | C→MC |
| " | 0.1 | | 2 | 2 | 30 | 60 | 7 | 5 | none | F→M | M |
| AMD/MAN 70/30 | 0.13 | 200–210 | 71 | 15 | 7 | 6 | 1 | 6 | none→few | MC | C |
| AMD | 0.12 | 190–200 | 2 | 4 | 17 | 61 | 16 | 16 | none | M→MC | MC/C |
| AMD+10% DDM | 0.16 | 219–223 | 3 | 5 | 24 | 60 | 9 | 2 | none | M | MC |
| " | 0.1 | 217–226 | | | | | | | very few | MC→M | MC/C |
| " | 0.65 | 185–195 | 3 | 0.5 | 5 | 19 | 73 | 3 | few | M→MC | MC/C |
| " | 0.75 | 190–200 | 88 | 9 | 2 | 0.5 | 0 | 52 | none→few | C→MC | C |
| AMD | 0.15 | 199–206 | 3 | 45 | 38 | 14 | 0.7 | 17 | none | F→FM | M |
| AMD (Repeat of above) | ND | 195–210 | 0.6 | 3 | 41 | 55 | 0.9 | 18 | none | FM | M→MC |
| AMD | 0.29 | 218–225 | | | | | | | few | MC→M | MC |
| " | 0.7 | 240–280 (dec) | 37 | 20 | 19 | 23 | 1.5 | 18 | few | MC→M | C→MC |
| AMD+10% DDM | 0.14 | 198–203 | 8 | 15 | 24 | 37 | 16 | 17 | none | MC | C |
| " | 0.21 | 214–222 | | | | | | | few-man | M→FM | MC |
| AMD | 0.58 | 228–235 | | | | | | | few-many | MC→M | M→MC |
| AMD/Vst | 0.12 | ND | 0.8 | 3 | 15 | 67 | 14 | 11 | none | MC→M | M→MC/C |

What is claimed is:

1. In the preparation of structural foams from foamable polyphenylene oxide resins, the method of improving the cellulose structure of such foams which comprises incorporating into the resin composition prior to blowing thereof 0.5 to 5 parts per hundred parts by weight of said resin composition of a cell regulating additive comprising an acrylamide polymer containing at least 80% of the moiety of the formula

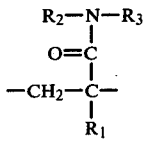

wherein $R_1$ is H or an alkyl group of 1 to 4 carbon atoms wherein $R_2$ and $R_3$ are independently selected from the group consisting of H, hydrocarbyl of 1 to 20 carbon atoms and oxygenated hydrocarbyl radicals; provided that when $R_2$ is other than H or a linear alkyl of 1 to 10 carbon atoms, $R_3$ must be H.

2. The method as defined in claim 1 wherein said acrylamide polymer is a homopolymer of acrylamide having an average molecular weight below 20,000.

3. The method as defined in claim 2 wherein said polyphenylene oxide resin comprises a blend of polyphenylene oxide and polystyrene.

4. The method as defined in claim 3 wherein said acrylamide polymer is an interpolymer obtained by co-polymerizing an acrylamide compound with another monomer containing a vinyl group.

5. The method as defined in claim 4 wherein said vinyl group-containing monomer is styrene.

6. The method as defined in claim 4 wherein said vinyl group-containing monomer is an alkyl acrylate or alkyl methacrylate.

7. The method as defined in claim 4 wherein said vinyl group-containing monomer is a $C_{10}$ to $C_{20}$ alkyl acrylate or methacrylate.

8. The method as defined in claim 4 wherein said vinyl group-containing monomer is a vinyl ester of a $C_{10}$ to $C_{20}$ fatty acid.

9. Molding composition for the production of formed structural foam resin articles comprising a foamable polyphenylene oxide-polystyrene resin blend, a chemical blowing agent, and 0.5 to 5 parts per hundred parts by weight of said resin blend of a cell regulator for said foam, said cell regulator consisting essentially of an acrylamide polymer having an acrylamide content of at least 80%.

10. Composition as defined in claim 9 wherein said acrylamide polymer is one having an average molecular weight of less than 20,000.

11. Composition as defined in claim 10 wherein said acrylamide polymer is a homopolymer of acrylamide having an intrinsic viscosity of about 0.15.

12. Composition as defined in claim 9 wherein said acrylamide is an interpolymer of an acrylamide compound with at least one other monomer compound containing a vinyl group.

13. Composition as defined in claim 12 wherein said other monomer compound corresponds to the formula:

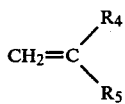

wherein $R_4$ and $R_5$ are independently selected from the group consisting of H, hydrocarbyl of 1 to 20 carbon atoms and substituents of hereinafter recited groups (A), (B), (C) and (D), provided that if $R_4$ is H, hydrocarbyl or (A) then $R_5$, is taken from group (B), (C) or (D); said group (A) consisting of hydrocarbyl of 1 to 20 carbon atoms substituted by one or more substituents from the group consisting of
  halogen, cyano, hydroxy, mercapto, acyl of 1 to 20 carbon atoms, carboxyalkyl of 1 to 20 carbon atoms, oxyacyl of 1 to 20 carbon atoms, amino, mono- and dialkyl amino having 1 to 20 carbon atoms in the alkyl group;
said group (B) consisting of
  halogen, cyano, oxa-alkyl, thia-alkyl, acyl of 1 to 10 carbon atoms, —$SO_3H$, pyridyl, imidazolyl, pyrrolidyl, pyrrolidonyl and furanyl;
said group (C) consisting of carboxyalkyl residues of the formula

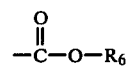

wherein $R_6$ is H, hydrocarbyl of 1 to 20 carbon atoms, oxa-alkenyl, thia-alkenyl, hydrocarbyl of 1 to 20 carbon atoms substituted by at least one substituent of the above-recited (A) group, furfuryl, tetrahydrofurfuryl, and polyalkylene glycols of the formulae

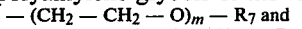

wherein m is 2 to 15 and $R_7$ is H or a hydrocarbyl radical of 1 to 10 carbon atoms;
and said group (D) consists of oxyacyl residues of the formula

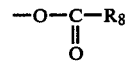

wherein $R_8$ is H, hydrocarbyl of 1 to 20 carbon atoms, or a substituted hydrocarbyl radical containing one or more substituents from the above-recited (A) group.

14. Composition as defined in claim 12 wherein said other monomer compound is styrene.

15. Composition as defined in claim 12 wherein said other monomer is a $C_{10}$ to $C_{20}$ alkyl acylate or methacrylate.

16. Composition as defined in claim 9 wherein said acylamide polymer has an acrylamide content of above 85%.

17. Composition as defined in claim 9 wherein said acrylamide polymer is one obtained by copolymerizing of two different acrylamides each corresponding to the structural formula

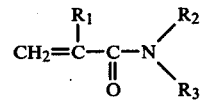

wherein:
  $R_1$ is H or a lower alkyl group and
  $R_2$ and $R_3$ are each independently selected from the group consisting of H, hydrocarbyl of 1 to 20 carbon atoms, and oxygenated hydrocarbyl radicals; provided that if $R_2$ is other than H or a linear alkyl group of 1 to 10 carbon atoms, then $R_3$ is H.

18. Molding composition for the production of formed structural foam resin articles, comprising a foamable blend of polyphenylene oxide-polystyrene resins, a chemical blowing agent and a cell regulator for such foam, said cell regulator consisting essentially of a copolymer of acrylamide and stearyl methacrylate.

19. Molding composition for the production of formed structural foam resin articles, comprising a foamable blend of polyphenylene oxide - polystyrene resins, a chemical blowing agent comprising p-toluene sulfonyl semicarbazide, and a cell regulator for such foam, said cell regulator consisting essentially of a copolymer of acrylamide and N-t-butyl acrylamide.

* * * * *